United States Patent [19]

Dischert et al.

[11] Patent Number: 5,274,439
[45] Date of Patent: Dec. 28, 1993

[54] APPARATUS FOR CLIPPING OR LIMITING COLOR SIGNALS TO MAINTAIN COLOR BALANCE

[75] Inventors: Lee R. Dischert, Medford; Thomas J. Leacock, Mount Laurel, both of N.J.

[73] Assignee: Panasonic Technologies, Inc., Secaucus, N.J.

[21] Appl. No.: 861,147

[22] Filed: Mar. 31, 1992

[51] Int. Cl.$^5$ .............................................. H04N 9/64
[52] U.S. Cl. ............................................ 358/27; 358/29
[58] Field of Search ................ 358/29, 27, 41, 22, 358/75, 80, 28

[56] References Cited

U.S. PATENT DOCUMENTS

| | | | |
|---|---|---|---|
| 4,047,202 | 9/1977 | Poetsch | 358/29 |
| 4,750,032 | 6/1988 | Nakayama | 358/29 |
| 4,797,733 | 1/1989 | Takagi et al. | 358/29 |
| 4,893,180 | 1/1990 | Shigaki et al. | 358/75 |
| 4,987,485 | 1/1991 | Hirota | 358/80 |
| 5,038,216 | 8/1991 | Easterly et al. | 358/228 |

OTHER PUBLICATIONS

Novak, Carol L. et al. "Obtaining Accurate Color Images for Machine Vision Research," *SPIE/Perceiving, Measuring and Using Color*, vol. 1250, 1990, pp. 54–68.

*Primary Examiner*—James J. Groody
*Assistant Examiner*—Glenton B. Burgess
*Attorney, Agent, or Firm*—Ratner & Prestia

[57] ABSTRACT

A color video signal processing system determines when one component color signal has been limited by clipping and limits the other component color signals to maintain accurate hue in the reproduced image. In one system, the other color signals are held at their values at the instant the one signal was detected as being clipped until the signal is no longer clipped. In another system, an attenuation function is applied to the unclipped color signals when any one color signal is detected as being clipped.

9 Claims, 5 Drawing Sheets

APPARATUS FOR CLIPPING OR LIMITING COLOR SIGNALS TO MAINTAIN COLOR BALANCE

BACKGROUND OF THE INVENTION

This invention concerns apparatus for limiting the amplitude of color signals in a color television camera or a color television signal processor. In particular, it relates to apparatus for detecting when the amplitude of one color signal has been limited in order to limit the amplitude of other color signals.

One step in the alignment of a television camera is to obtain proper color balance. This is performed by placing a white object in the field of view of the camera and either manually adjusting the gains of the various red, green and blue color signals or allowing the camera to automatically adjust the gains of the color signals to produce signal which will cause a white image of the object to be reproduced on a display device. The color signal levels produced by the color balance operation define maximum red, green and blue signal levels for the camera.

A problem may occur, however, when, after color balance calibration, an image viewed by the camera contains objects which are brighter than the object that was used for the color balance operation or which have higher color saturation values than are allowed by the respective red, green and blue signal levels developed from the color balance operation. When objects in the image are brighter than the object used for the white balance calibration, the respective red, green and blue signals which describe these objects may be clipped. That is to say, held at the maximum digital or analog value that may be provided by the camera.

When, due to a bright object in the camera's field of view, one of the color signals is clipped while the other color signals are not clipped, errors in hue can occur in the resulting image. These errors tend to desaturate the image of the bright object causing, for example, a solid yellow object to appear mottled with white. In addition, if significant texture information was contained in the signals that were clipped, this may be lost in the reproduced image of the object.

Problems of the type described above also occur in television receivers. It is commonly known, for example, that supersaturated color images may be produced by controlling the amplitude of the color-burst component relative to image-signal components of the television signal. If the maximum amplitude of the digitized color signals are set relative to the burst component, then the amplitudes of supersaturated portions of the image may be clipped, producing the same desaturation and loss of image detail artifacts as described above.

A system which detects the clipping of color signals is described in an article by C. L. Novac et al. entitled, "Obtaining Accurate Color Images For Machine Vision Research," Proceedings of the International Society for Optical Engineering, Vol. 1250, pp. 54–68, which is hereby incorporated by reference for its teachings on color signal processing. This paper describes an algorithm for color machine vision which attempts to classify objects in an image by their color.

Color signal clipping is described in this reference as a type of distortion which can be detected but not corrected. Two solutions to this problem are proposed. First, to eliminate the effective pixels from further consideration and, second, to make educated guesses as to what the true hue of the distorted pixels may be. The paper gives no guidance as to how these educated guesses might be made.

Another system which attempts to limit the effects of bright objects in an image is described in U.S. Pat. No. 5,083,216 entitled, AUTOMATIC BRIGHTNESS ALGORITHM IN A SLIDE-TO-VIDEO TRANSFER UNIT. This system repeatedly scans an image through a video camera varying the aperture of the camera until the percentage of peak values which are above a defined maximum value is less than or equal to three percent of the sample values in the image.

SUMMARY OF THE INVENTION

The present invention is embodied in a color video signal processing system which determines when one color signal has been clipped and, in response to this determination, acts to limit the amplitude of the other color signals so as to maintain accurate hue information in the reproduced image.

According to a first aspect of the invention, when one of the color signals is clipped, the other color signals are held at amplitude values which occurred at the instant the clipped signal was detected.

According to a second aspect of the invention, when one of the color signals is clipped, the amplification factor applied to the other color signals is limited to reduce the amplitude of the unclipped signals without eliminating amplitude variations.

DETAILED DESCRIPTION

Figure 1:
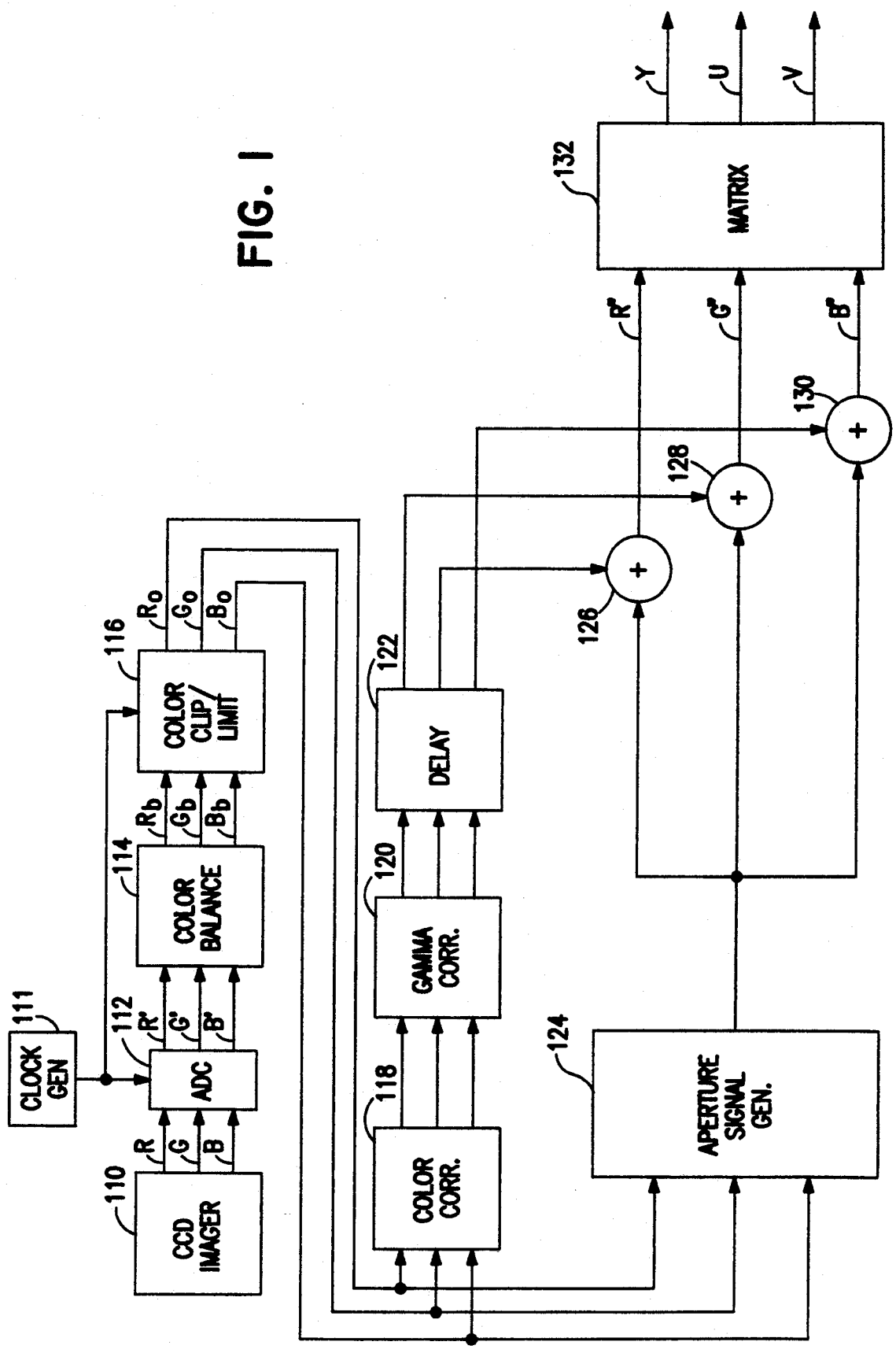
FIG. 1 is a block diagram of an exemplary color television camera which includes an embodiment of the present invention.

In the exemplary camera shown in FIG. 1, a CCD imager 110 provides red (R), green (G) and blue (B) signals representing a color image. The CCD imager 110 may include, for example, a conventional CCD matrix having an integral color filter mosaic and circuitry which processes the signals provided by the CCD matrix to generate separate red, green and blue color signal components.

The analog red, green and blue signals provided by the CCD imager 110, are applied to analog-to-digital converter (ADC) 112 which generates respective digitally sampled red R', green G' and blue B' color signals synchronous with a clock signal, CLOCK, provided by a clock signal generator 111. The digitized color signals provided by the ADC 112 are applied to color-balance circuitry 114. Circuitry 114 automatically adjusts amplification factors applied to the respective digital signals so that the brightest object in the camera's field of view will appear white on the reproduced image. The color-balance calibration is performed once during the initial camera set-up. The gain factors developed in this calibration step, however, are applied to the R', G' and B' signals provided by the ADC 112 during the remainder of normal imaging operation. If a signal exceeds the maximum amplitude value which can be represented by a digital signal value, for example, 255 for an 8-bit digital sample, the color-balance circuit 114 limits the value of that signal to the maximum digital value.

Amplitude-adjusted red, green and blue color signals ($R_b$, $G_b$, and $B_b$) provided by the color-balance circuitry 114 are applied to a color clip/limit circuit 116. The circuit 116 is described in detail below with reference to FIGS. 2 through 6.

Red, green and blue color signals ($R_o$, $G_o$ and $B_o$) provided by the color clip/limit circuit are applied in parallel to color correction circuitry 118 and aperture signal generator 124. The color correction circuitry 118 may, for example, process the color signals $R_o$, $G_o$ and $B_o$ provided by the circuitry 116 to generate color-shifted red, green and blue signals which produce correct image hues on a target image device. The circuitry 118 effectively converts the colors passed by the color filters used in the CCD imager 110 into signals which will reproduce the image colors correctly under a target video standard (e.g. NTSC, PAL or SECAM).

The corrected color signals provided by the circuitry 118 are applied to gamma correction circuitry 120. Gamma correction circuitry 120 applies a non-linear transfer function to the corrected red, green and blue color signals produced by the circuitry 118 to provide signals which generate proper gray-scale images under a target video standard (e.g. NTSC, PAL or SECAM).

The output signals provided by the gamma correction circuitry 120 are delayed through a delay element 122, which compensates for signal processing delays through the aperture signal generator 124, and are then applied to respective adders 126, 128 and 130. The other input signal to each of the adders 126, 128 and 130 is a peaking signal generated by the aperture signal generator 124. This peaking signal is a high-frequency signal which is added to all of the component color signals. The effect of this operation is to emphasize high-frequency components in the image signal relative to low-frequency components. Since this signal is added to each of the red, green and blue color signals, it acts to emphasize the high-frequency components as a monochrome signal. That is to say, the effect it produces is visible mainly in the luminance signal, Y, produced by the camera.

The output signals (R", G" and B") of the adders 126, 128 and 130 are applied to a matrix 132 which generates the luminance signal, Y, and two color difference signals, I and Q, from the three primary color signals R", G" and B".

Figure 2:
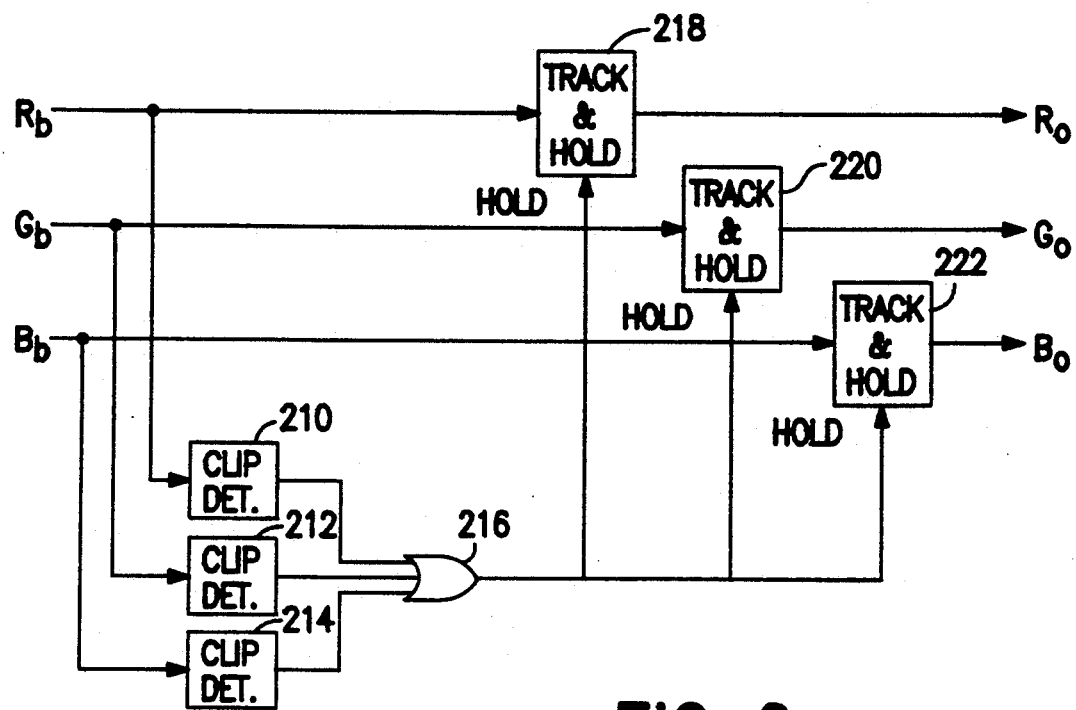
FIG. 2 is a block diagram of a color limiting and clipping apparatus suitable for use in the camera shown in FIG. 1.

FIG. 2 is a block diagram of exemplary clip/limit circuitry which may be used as the circuitry 116 shown in FIG. 1. The circuitry shown in FIG. 2 operates on analog red, green and blue signals. Accordingly, if this circuitry were used in the camera shown in FIG. 1, ADC 112 would be omitted and at least the color balance circuitry 114 would operate on analog signal levels.

In the circuitry shown in FIG. 2, the signals $R_b$, $G_b$ and $B_b$ are applied to respective track-and-hold circuits 218, 220 and 222. Each of these circuits may include, for example, a capacitive storage element (not shown) coupled to receive the respective color signal through an analog gate (not shown). The track-and-hold circuits are controlled by a signal HOLD provided by an OR gate 216. In the exemplary circuit, this signal controls the conductivity of the analog gate. In response to this signal, the output signal of the track-and-hold circuit will either track the signal applied to the circuit (analog gate conductive) or hold it at the signal level applied to the circuit when the signal HOLD was activated (analog gate non conductive). The OR gate 216 receives three input signals from respective clip detection circuits 210, 212 and 214. The clip detection circuit 210 is coupled to receive the red color signal ($R_b$) while the circuits 212 and 214 are coupled to receive the green $G_b$ and blue $B_b$ color signals respectively.

In this embodiment of the invention, the clip detection circuits 210, 212 and 214 may be, for example, conventional threshold detectors which detect when one of the red, green and blue color signals exceed a predetermined threshold value. When this occurs, the detecting circuit emits a logic-high level. When any one of the circuits 210, 212 and 214 emits a logic-high level, the signal HOLD applied to all three track-and-hold circuits 218, 220 and 222 becomes logic-high. In response to a logic-high value for the signal HOLD, the track-and-hold circuits 218, 220 and 222 maintain their respective output signal levels at the values they passed when the signal HOLD became logic-high.

Figure 6A:
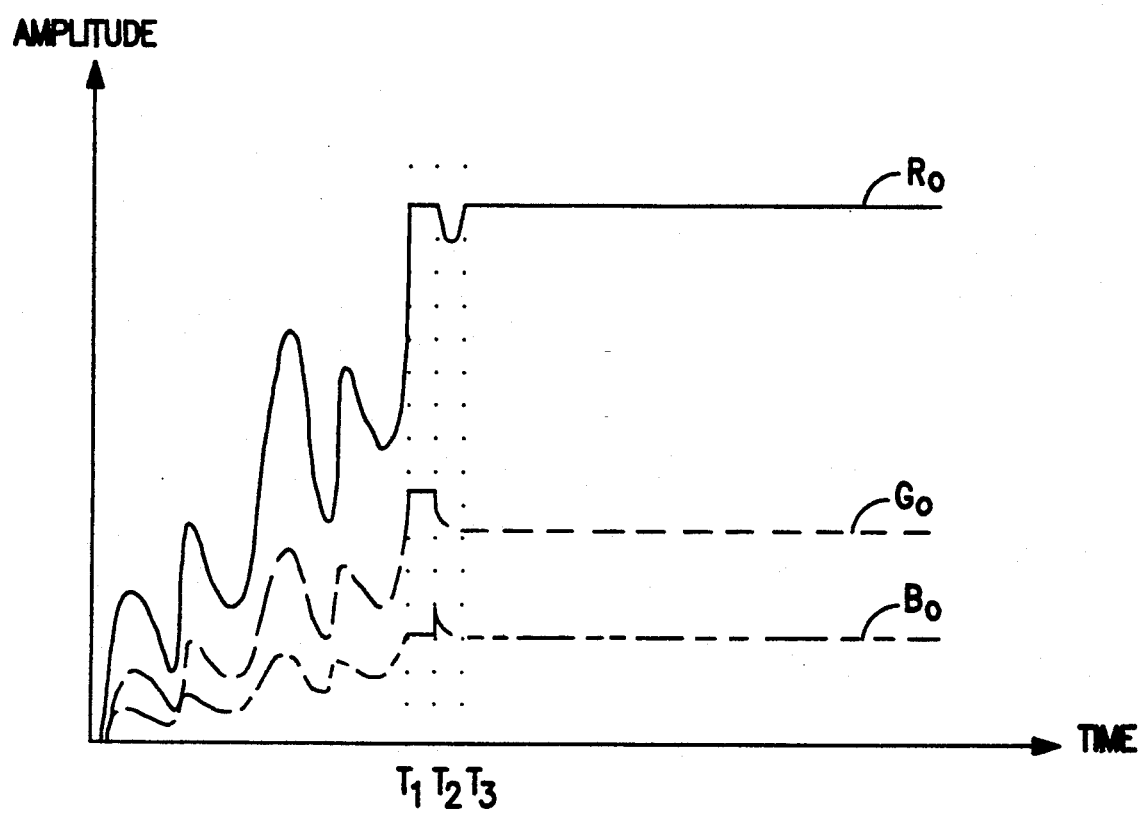
FIGS. 6A and 6B are graphs of signal amplitude versus time which are useful for describing the operation of the circuitry shown in FIGS. 1 through 5.

The effect of this circuit is shown in FIG. 6A. At time $T_1$, the signal R exceeds the threshold value and is detected by the clip detector 210. The clip detector 210 applies a logic-high value to the OR gate 216. In response to this value, the gate 216 applies the signal HOLD to the three track-and-hold circuits 218, 220 and 222. This signal causes the track-and-hold circuits 220 and 222 to maintain the level of the respective green and blue signals at the level which occurred at time $T_1$, the time that the clipped $R_b$ signal was detected. These levels are maintained until the level of the signal $R_b$ which initiated the limit operation falls below the threshold at time $T_2$. While the signal $R_b$ is not clipped between times $T_2$ and $T_3$, the track-and-hold circuits 218, 220 and 222 follow the variations of the respective signals $R_b$, $G_b$ and $B_b$. At time $T_3$, however, when the signal $R_b$ is clipped again, the track-and-hold circuits 220 and 222 hold the respective signals $G_o$ and $B_o$ at the respective values of $G_b$ and $B_b$ at time $T_3$.

Figure 3:
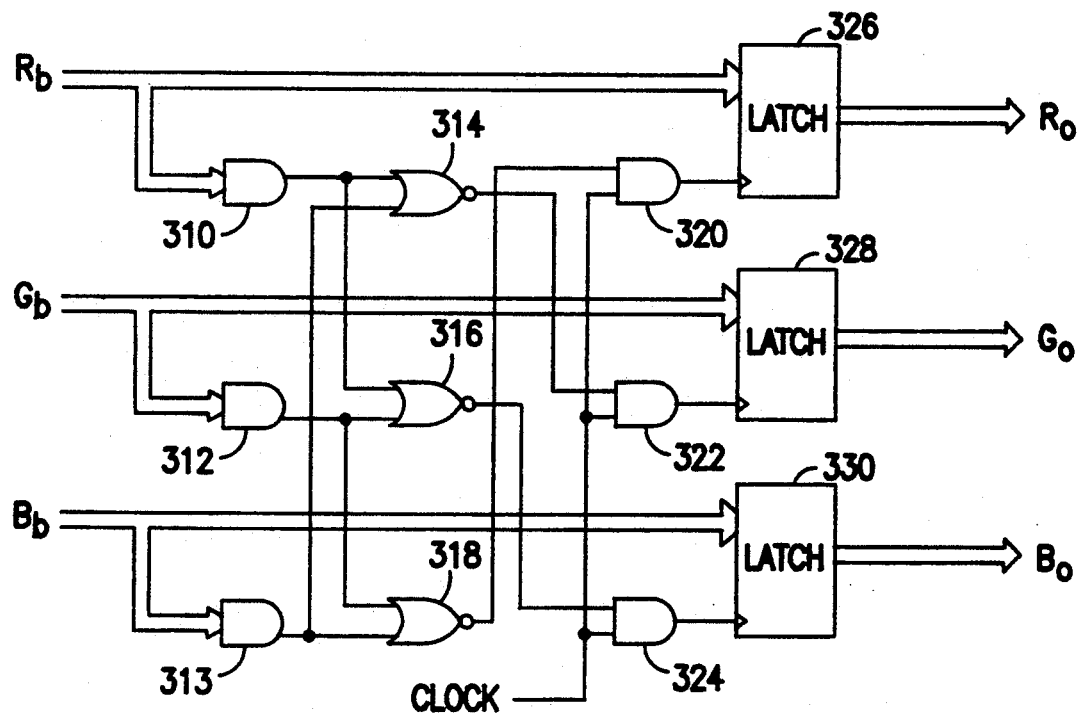
FIG. 3 is a logic diagram showing an exemplary color limiting and clipping circuit which may be used in a digital camera system.

FIG. 3 is a logic diagram of a digital circuit which operates in the same manner as the circuit shown in FIG. 2. In FIG. 3, the red, green and blue color signals are applied to respective AND gates 310, 312 and 313. These AND gates act as digital value decoders. When all of the input signals to one of these gates are logic-high, the respective color signal value is the largest digital value that can be represented and, so, the output signal of the gate is logic-high. The output signals produced by AND gate 310 are applied to first input terminals of NOR gates 314 and 316, respectively. Likewise the output signal of AND gate 312 is applied to NOR gates 316 and 318 while the output signal of AN gate 313 is applied to NOR gates 318 and 314.

The output signal of NOR gate 314 is applied to one input terminal of an AND gate 322 while the output signal of NOR gate 316 is applied to one terminal of AND 324 and the output signal of NOR gate 318 is applied to one input terminal of an AND gate 320. The other input terminal of each of the AND gates 320, 322 and 324 is coupled to receive the clock signal CLOCK. The output terminals of the AND gates 320, 322 and 324 are coupled to respective clock input terminals of latches 326, 328 and 330. The data input terminals of these latches are coupled to receive the respective $R_b$, $G_b$ and $B_b$ color signals. The output signals of the latches 326, 328 and 330 are the respective limited $R_o$, $G_o$ and $B_o$ color signals.

During normal operation, when no clipped signals occur, the red, green and blue color signals are latched, one sample at a time responsive to the signal CLOCK, into latches 326 and 328 and 330. These samples are available at the output ports of the respective latches with a delay of one period of the sampling clock signal CLOCK.

When one of the signals $R_b$, $G_b$ or $B_b$ has a value of all ones (e.g. 255 for an 8-bit sample), the respective clip detector 310, 312 or 313 will provide a logic high output signal to two of the NOR gates 314, 316 and 318. In response to this signal, the NOR gates will provide logic-low output signals, disabling two of three latches from changing state. Thus, these latches will hold the corresponding signal levels of the other two color signals to respective levels which occurred at the time that the one color signal was detected as being clipped.

Figure 4:
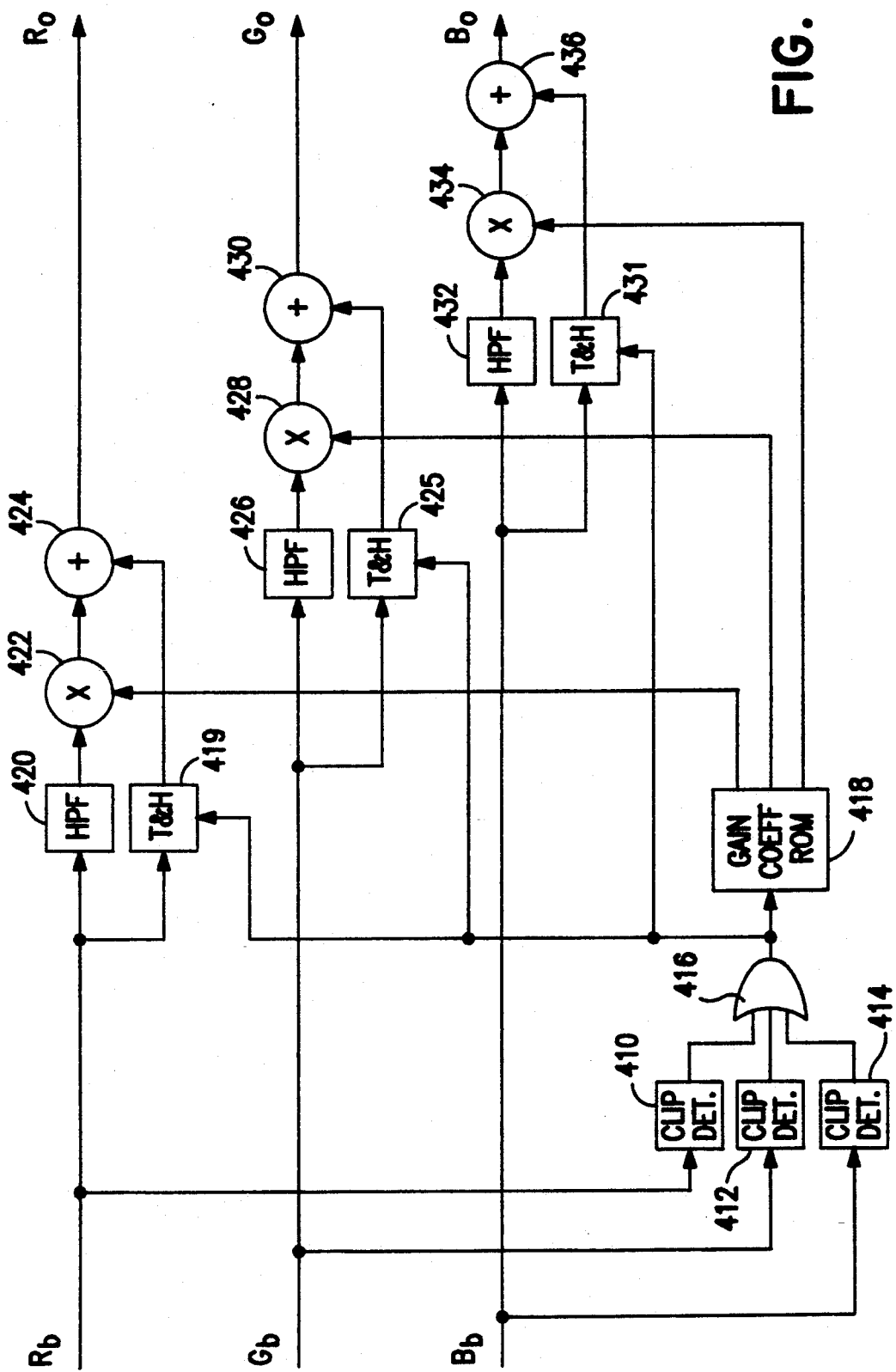
FIG. 4 is a block diagram of an exemplary color-signal gain-limiting apparatus suitable for use as the color-clipping/limiting circuit shown in FIG. 1.
Figure 5:
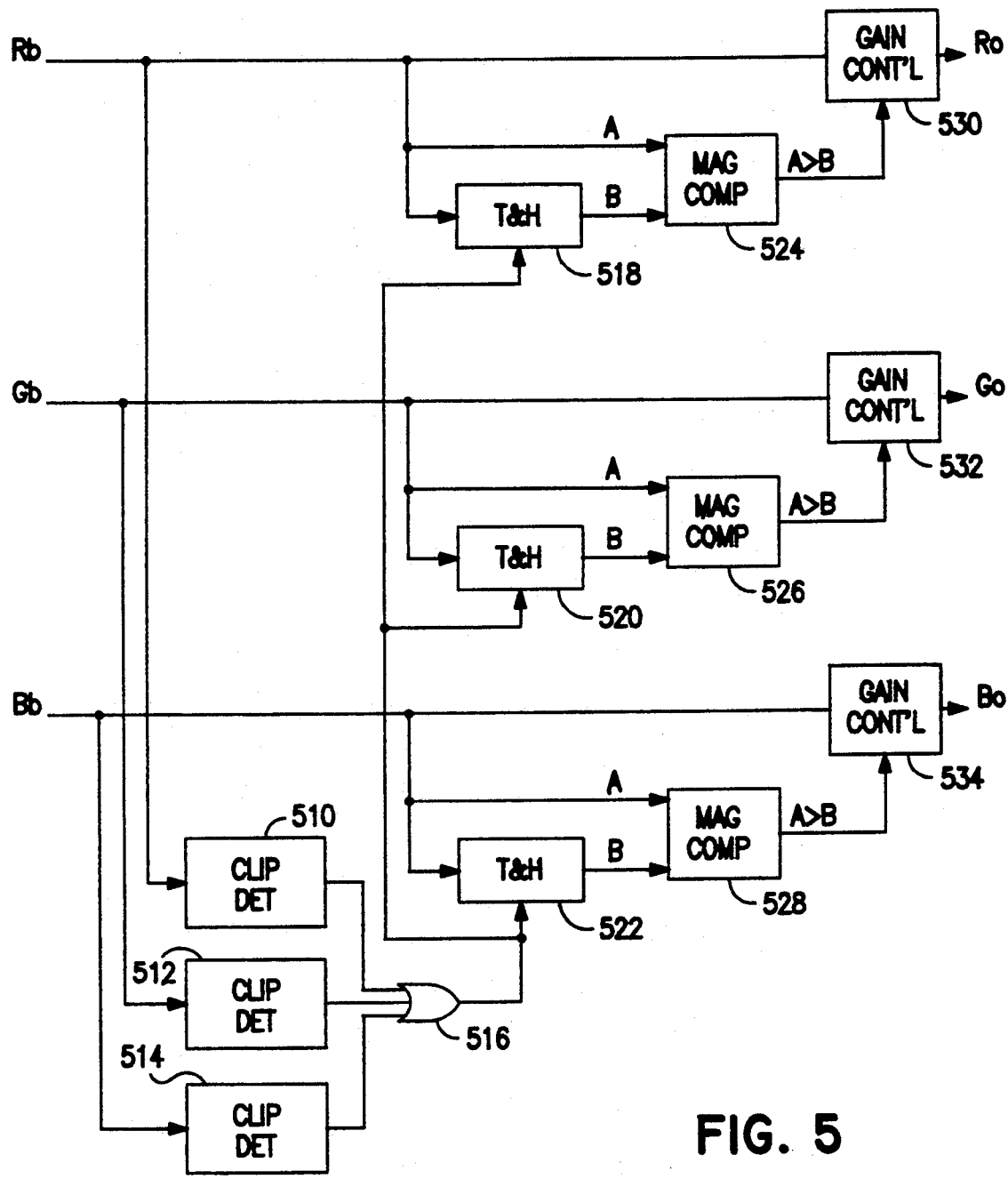
FIG. 5 is a logic diagram showing digital color-signal gain-limiting apparatus which may be used as the color-clipping/limiting circuitry in the camera shown in FIG. 1.

Although the circuits shown in FIGS. 2 and 3 maintain proper hue for the object which has been clipped, texture detail which may be contained in the unclipped color signals may be lost. Any texture information conveyed by the signal which was clipped is irretrievably lost; however, texture information contained in the other two signals need not be lost. Exemplary color limiting circuitry which attempts to maintain at least a portion of the texture information conveyed by the unclipped signals is shown in FIGS. 4 and 5. These circuits act to limit the amplitude of the unclipped color signals by attenuating the signals rather than by holding the signals at fixed values.

The circuitry shown in FIG. 4 operates on analog $R_b$, $G_b$ and $B_b$ color signals. In this circuitry, the clip detectors 410, 412 and 414 and the OR gate 416 operate in the same manner as the respective elements 210, 212, 214 and 216 shown in FIG. 2. In FIG. 4, however, the output signal of the OR gate 416 is applied to a gain coefficient ROM 418 and to control input of three track and hold circuits 419, 425 and 431. The ROM 418 provides a digital control signal to each of three two-quadrant multipliers 420, 422 and 424. As in the exemplary embodiment shown in FIG. 2, the track-and-hold circuits 419, 425 and 431 are coupled to receive respective color signals $R_b$, $G_b$ and $B_b$. Unlike the embodiment shown in FIG. 2, however, these color signals are also coupled to respective high-pass filters 420, 426 and 432. The output signals provided by these filters are applied to the multipliers 422, 428 and 434, respectively. The scaled high-frequency components of the signals $R_b$, $G_b$ and $B_b$ provided by the multipliers 422, 428 and 434 are, in turn, added to the respective output signals of the track-and-hold circuits 419, 425 and 431 by the adders 424, 430 and 436 to produce the signals $R_o$, $G_o$ and $B_o$, respectively.

The circuit shown in FIG. 4 superimposes attenuated high-frequency components of the various color signals onto the signals produced by the track-and-hold circuits when any one clipped color signal is detected. During normal operation, when no clipped signals are detected, the gain coefficient ROM 418 provides a factor of zero to the multipliers 422, 428 and 434 so the output signals $R_o$, $G_o$ and $B_o$ are the signals $R_b$, $G_b$ and $B_b$ passed by the respective track-and-hold circuits 419, 425 and 431.

Alternatively, the multpliers 424, 428 and 434 may be eliminated in the circuit shown in FIG. 4 if a low-pass filter (not shown) is inserted before each of the track and hold circuits 419, 425 and 431. In this configuration, the high-pass filters 420, 426 and 432 pass the high frequency components of the signals with a gain of unity while the track and hold circuits 419, 425 and 531 track or hold only the low-frequency components of the signals. The signals provided by the respective high-pass filters and track and hold circuits are summed in the adders 424, 430 and 436 to produce the output signals $R_o$, $G_o$ and $B_o$.

FIG. 5 is a logic diagram of digital circuitry which performs substantially the same function as the circuitry shown in FIG. 4. In FIG. 5, clip detectors 510, 512 and 514 are coupled to receive the $R_b$, $G_b$ and $B_b$ signals respectively and to provide a logic-high output signal when one of the color signals has been clipped. The output signals of these detectors are ORed by the orgate 516 to produce a single control signal which is applied to each of three track and hold circuits 518, 520 and 522. These clip detectors and track and hold circuits operate in the same manner as the gates 310, 312 and 313, and latches 326, 328 and 330, described above. The output signals of the track and hold circuits 518, 520 and 522 are coupled to first input ports of respective magnitude comparators 524, 526 and 528. The second input port of each of the magnitude comparators 524, 526 and 528 are coupled to receive the respective signals $R_b$, $G_b$ and $B_b$. The signals $R_b$, $G_b$ and $B_b$ are also applied to respective gain control circuits 530, 532 and 534 which are controlled by output signals generated by the magnitude comparators 524, 526 and 528, respectively. The gain control circuits 530, 532 and 534 may be, for example, read-only memories (ROM's) which pass the signals $R_b$, $G_b$ and $B_b$ as the signals $R_o$, $G_o$ and $B_o$ when the output signal of the respective magnitude comparators are logic-low and pass an attenuated version of the respective signals $R_b$, $G_b$ and $B_b$ otherwise. These read-only memories may be configured as linear or non-linear multipliers.

The invention is described in terms of the red color signals $R_b$ and $R_o$. The same analysis applies for the green color signals $G_b$ and $G_o$ and the blue color signals $B_b$ and $B_o$. In the exemplary embodiment of the invention, the 8-bit signal $R_b$ is applied as the 8 least-significant bits (LSB's) of the address value applied to gain control circuitry 530. The output signal of the magnitude comparator 524 is applied as the most significant bit (MS) of the address value. When neither of the green or blue signals is clipped, the MSB of the address value is zero and the 256 values which define the range of the $R_b$ signal are passed without translation as the output signal $R_o$.

When one of the signals $G_b$ or $B_b$ is clipped, however, the track and hold circuit 518 is engaged to hold the red signal at the value of $R_b$ which occurred when the clipped $G_b$ or $B_b$ signal was detected. If the instantaneous level of the signal $R_b$ exceeds this held value, output signal of the magnitude detector 524 becomes logic-high, changing the range of address values applied to the gain control circuitry 530. In response to this changed address range, the circuitry 530 passes an attenuated version of the signal $R_b$ as the signal $R_o$.

Gain control circuits 532 and 534 are similarly configured to accept the respective $G_b$ and $B_b$ signals as the 8 LSB's. Circuit 532 is configured to accept the output signal of magnitude comparator 526 as the most significant address bit while circuit 534 is configured to accept the output signal of magnitude comparator 528 as the most significant address bit. In this configuration, each of the signals $R_b$, $G_b$ and $B_b$ may be scaled by a respectively different attenuation function responsive to clipping in any of the other color signals.

Figure 6B:
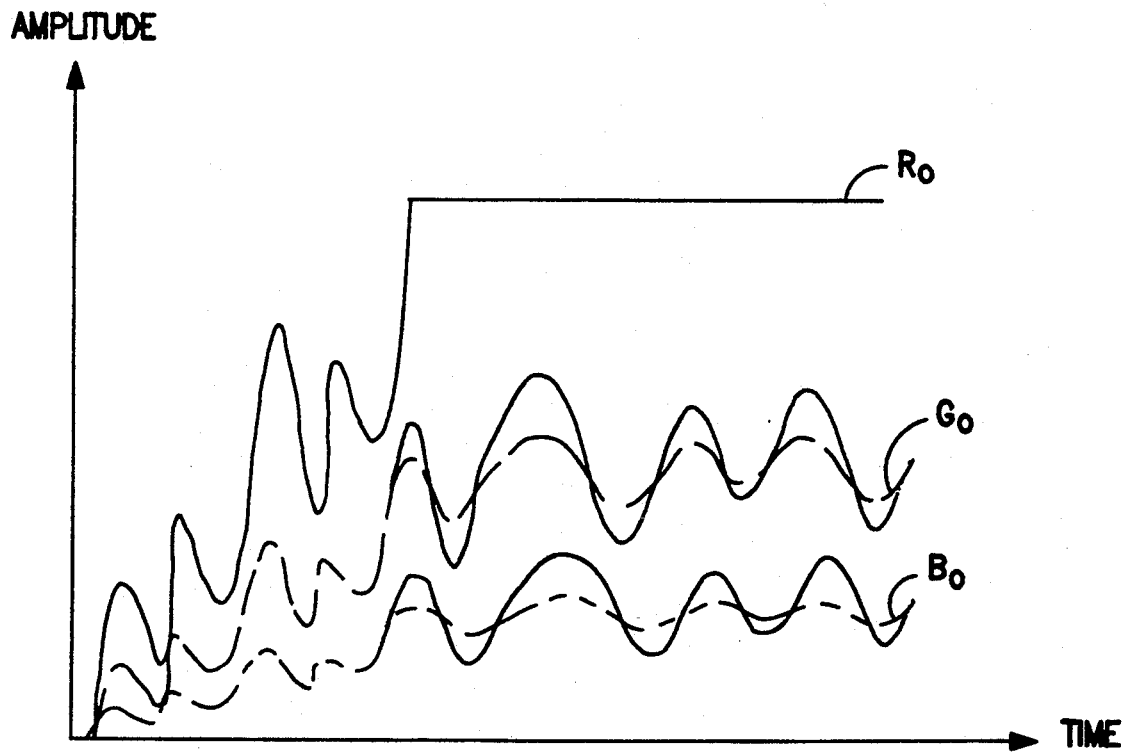

FIG. 6B is a graph of signal amplitude versus time for each of the red, green and blue color signals which illustrates the operation of the circuits shown in FIGS. 4 and 5 when the red signal is clipped. In FIG. 6B, the dashed lines represent the attenuated signals $G_o$ and $B_o$, while the dotted lines represent the unattenuated signals. Due to the attenuation of the $G_o$ and $B_o$ color signals, local desaturation of the light-red object represented by these signals is mitigated. For the circuit shown in FIG. 5, the troughs between peaks of the $G_o$ and $B_o$ waveforms may be deeper than are shown in FIG. 6B.

While the invention has been described in the context of a video camera, it is contemplated that it may be practiced in other video signal processing apparatus such as a television receiver. In a television receiver, the circuit would be configured to reduce desaturation in supersaturated portions of the image which may occur when the amplitude of the burst signal is reduced with respect to the amplitude of the color components of the video signal.

While the invention has been described in terms of a number of exemplary embodiments, it is contemplated that it may be practiced as outlined above with modifications within the spirit and scope of the appended claims.

What is claimed:

1. Apparatus which processes at least two color video signals representing an image comprising:
   clip detection means for determining when a first one of the color video signals has an amplitude value which exceeds a predetermined limiting amplitude value to produce a clip detection signal; and
   signal amplitude control means, including:
   means responsive to the clip detection signal, for limiting, in amplitude, at least a second one of the color video signals other than said first color video signal; and
   means for holding the second color video signal at an amplitude value exhibited by the second color video signal when the clip detection signal was first produced for as long as the clip detection signal continues.

2. Apparatus according to claim 1, wherein the color video signals are analog signals and wherein:
   the clip detection means includes a threshold detector which produces the clip detection signal when the first color video signal exceeds a predetermined signal amplitude value; and
   the signal amplitude control means includes a track and hold circuit.

3. Apparatus according to claim 1, wherein the color video signals are digital signals and wherein:
   the clip detection means includes a digital decoder circuit which produces the clip detection signal when the first color video signal exceeds a predetermined digital value; and
   the signal amplitude control means includes a digital register coupled to store samples of the second color video signal synchronous with a clock signal and to provide the stored samples as the second color video signal, the signal amplitude control means further including means for selectively disabling the clock signal responsive to the clip detection signal.

4. Apparatus which processes at least two color video signals representing an image comprising:
   clip detection means for determining when a first one of the color video signals has an amplitude value which exceeds a predetermined limiting amplitude value to produce a clip detection signal; and
   signal amplitude control means, including:
   means responsive to the clip detection signal, for attenuating at least a second one of the color video signals other than said first color video signal responsive to the clip detection signal.

5. Apparatus according to claim 4, wherein the color video signals are analog signals and wherein:
   the clip detection means includes a threshold detector which produces the clip detection signal when the first color video signal exceeds a predetermined signal amplitude value; and
   the signal amplitude control means includes a variable attenuator which selectively attenuates the second color video signal in response to the clip detection signal.

6. Apparatus according to claim 4, wherein:
   the clip detection means includes a decoder circuit which produces the clip detection signal when the first color video signal equals a predetermined value; and
   the signal amplitude control means includes a multiplier which selectively multiplies samples of the second color video signal by a scale factor responsive to the clip detection signal.

7. Apparatus according to claim 6, wherein said signal amplitude control means includes:
   means for detecting when the amplitude of the second color video signal is greater than the amplitude value which occurred when the clipped signal was detected to generate an amplitude control signal; and
   means for controlling the multiplier to attenuate samples of the second color video signal responsive to the amplitude control signal.

8. Apparatus which processes at least two digital color video signals representing an image comprising:
   a source of clock signal;
   a digital decoder circuit which produces a clip detection signal when a first one of said color video signals exceeds a predetermined digital value; and
   a digital register, having an input port coupled to receive samples representing a second one of said color video signals and an output port for supplying digital values representing said second color video signal, said digital register being coupled to store samples of the second color video signal responsive to the clock signal; and
   means, coupled to the digital register, for selectively disabling the clock signal responsive to the clip detection signal to cause the digital register to supply the stored sample as the second color video signal while the clip detection signal is active.

9. Apparatus which processes at least two digital color video signals representing an image to maintain accurate hue information when a first one of said color video signals is limited in amplitude due to clipping, said apparatus comprising:

a digital decoder circuit which produces a clip detection signal when the first color video signal exceeds a predetermined digital value; and a digital multiplier which selectively multiplies samples of a second one of said color video signals by a predetermined digital attenuation factor responsive to the clip detection signal.

* * * * *